Dec. 28, 1937.   N. J. CAVAGNARO   2,103,317
CUTTING MACHINE FOR SPAGHETTI, MACARONI, ETC
Filed Feb. 16, 1935   4 Sheets-Sheet 3
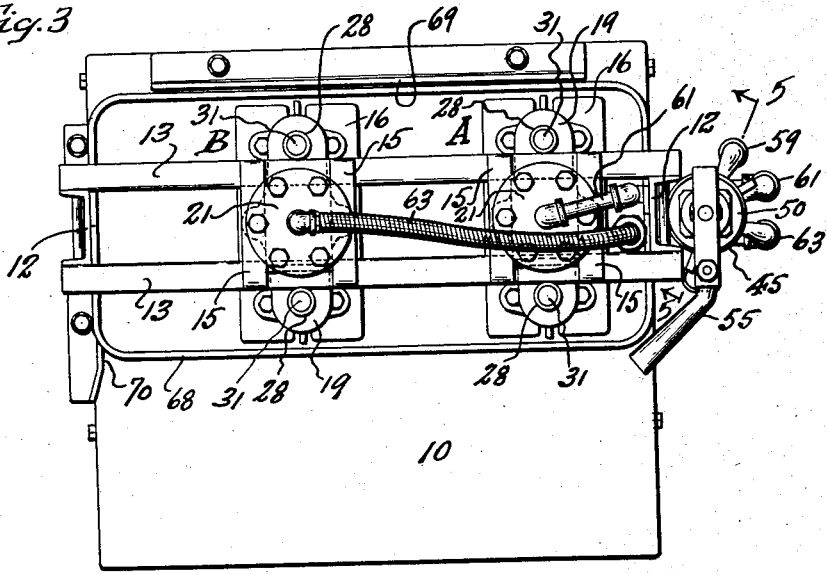
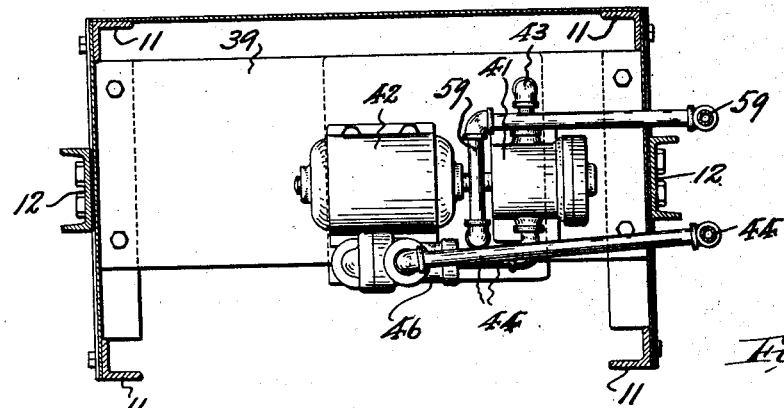
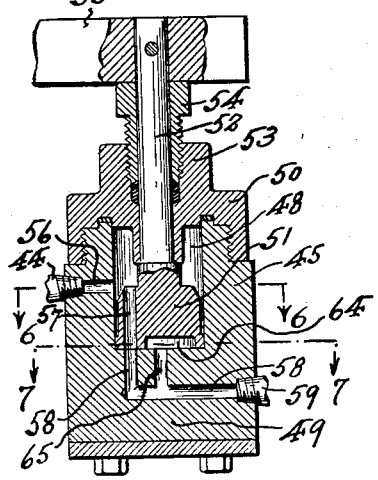
INVENTOR
Nicholas J. Cavagnaro,
BY
George D. Richards
ATTORNEY Dec. 28, 1937.   N. J. CAVAGNARO   2,103,317
CUTTING MACHINE FOR SPAGHETTI, MACARONI, ETC
Filed Feb. 16, 1935   4 Sheets-Sheet 4
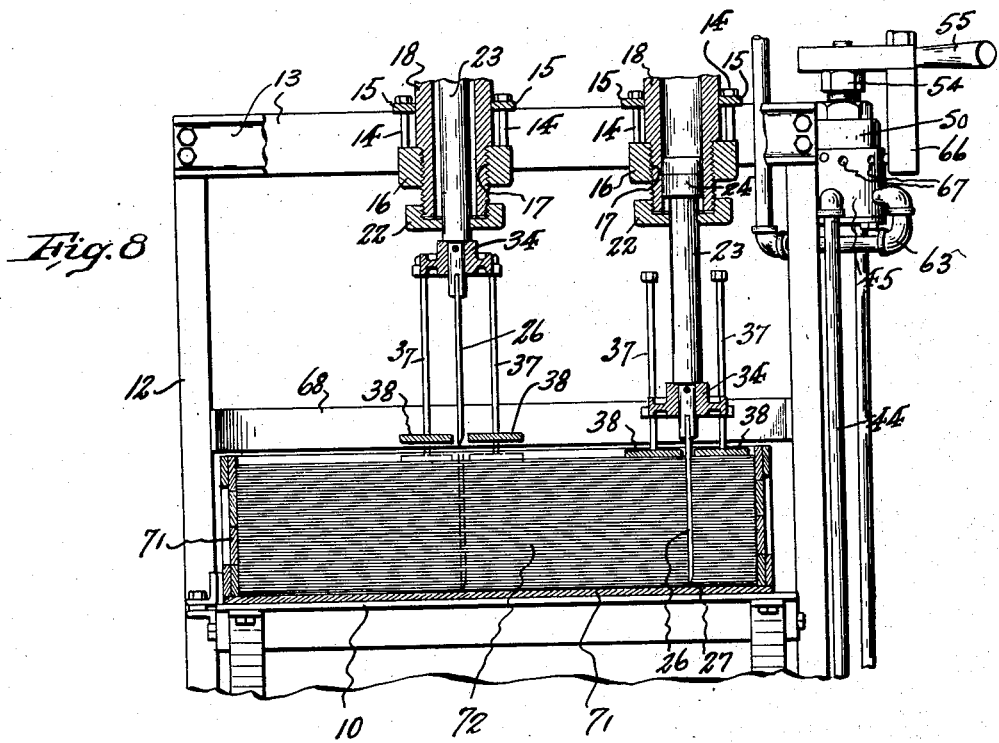
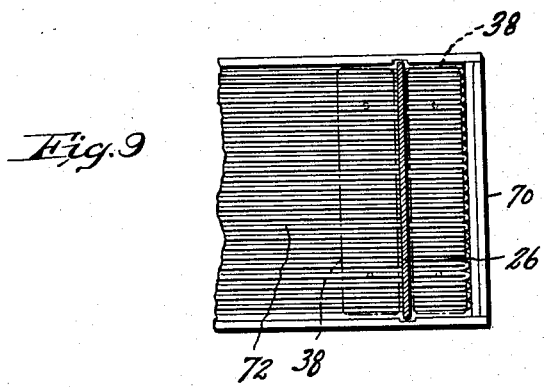
INVENTOR
Nicholas J. Cavagnaro,
BY
George D. Richards
ATTORNEY Patented Dec. 28, 1937

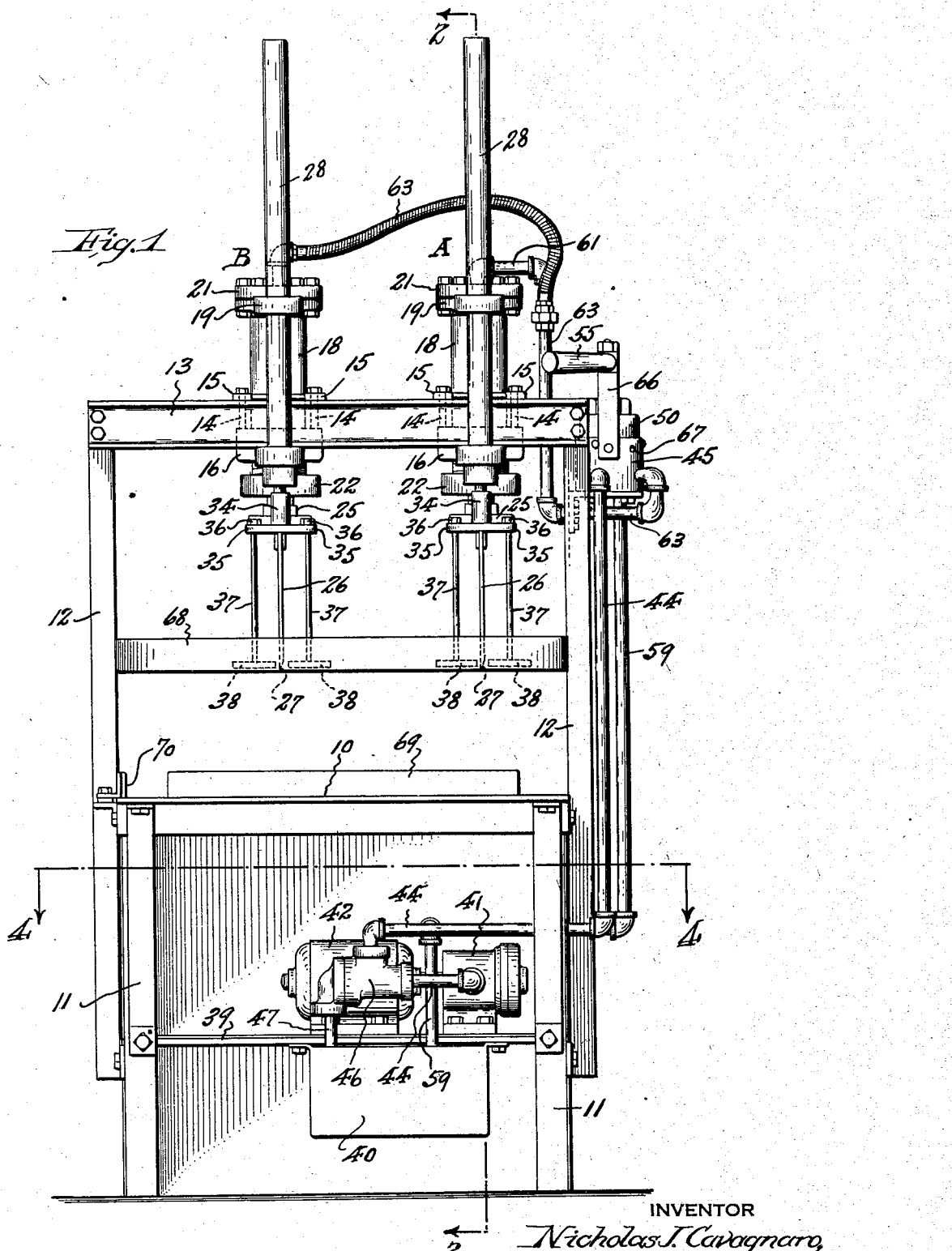

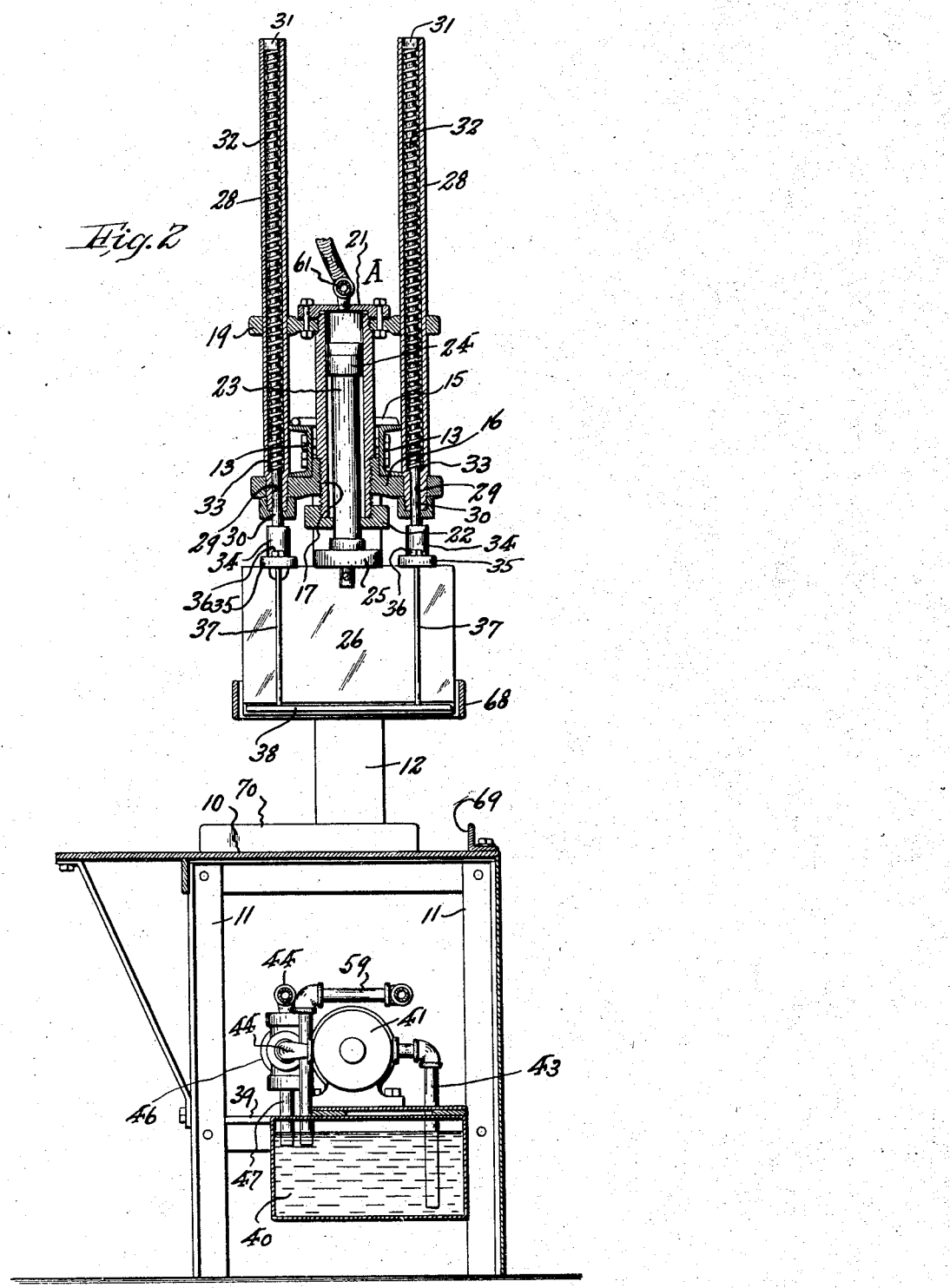

2,103,317

UNITED STATES PATENT OFFICE 2,103,317

CUTTING MACHINE FOR SPAGHETTI, MACARONI, ETC.

Nicholas J. Cavagnaro, Richmond Hill, N. Y., assignor to Consolidated Macaroni Machinery Corporation, Brooklyn, N. Y., a corporation of New York Application February 16, 1935, Serial No. 6,825

3 Claims. (Cl. 107—21)

This invention relates to improved means for cutting alimentary paste products, such as spaghetti, macaroni, etc., into lengths suitable for packaging; and the invention has reference, more particularly, to a cutting machine adapted to rapidly and efficiently cut the paste products without waste, discoloration or other undesirable effects.

This invention has for its principal object to provide a cutting machine adapted to cut all sizes of paste products at high speed and to lengths to suit a selected size of package; said machine being characterized by the possession of reciprocable cutting means together with means for producing, at will, the descending cutting strokes thereof, and means to return the cutting means to normal initial position upon completion of the cutting operation.

This invention has for a further object to provide a novel arrangement of hydraulic means for actuating the cutting means of the machine, together with control means therefor.

Other objects of this invention, not at this time more particularly enumerated, will be understood from the following detailed description of the same.

An illustrative embodiment of the invention is shown in the accompanying drawings, in which:

Fig. 1 is a front elevation of the novel paste cutting machine according to this invention; Fig. 2 is a longitudinal vertical section of the same, taken on line 2—2 in Fig. 1; Fig. 3 is a top end or plan view; Fig. 4 is a horizontal section, taken on line 4—4 in Fig. 1; Fig. 5 is an enlarged vertical sectional view of the control valve for the hydraulic cutter actuating means, taken on line 5—5 in Fig. 3; Fig. 6 is a horizontal section through said control valve, taken on line 6—6 in Fig. 5; and Fig. 7 is another horizontal section through said control valve, taken on line 7—7 in Fig. 5.

Fig. 8 is a fragmentary vertical longitudinal section of portions of the machine, to illustrate the functioning of the cutting blades thereof upon the paste product submitted to the action thereof; and Fig. 9 is a fragmentary horizontal section, taken on line 9—9 in Fig. 8.

Similar characters of reference are employed in the above described views, to indicate corresponding parts.

Referring to the drawings, the reference character 10 indicates the table of the machine, the same being supported by a suitable frame-work including legs 11. Secured to the table and its frame work, to extend vertically upward therefrom at each end thereof, are uprights or standards 12. Secured to and extending between the upper ends of said uprights or standards 12, at each side thereof, are cross-beams 13. Mounted upon said cross-beams 13, so as to be supported thereby in suitable locations above the table 10, are a plurality of hydraulically operated ram mechanisms for actuating the cutter means of the machine; as shown in the drawings there are two such ram mechanisms A and B, the detail construction of which being the same, a description of one will suffice for both.

The ram mechanism may be variously designed and constructed, but according to the illustrative embodiments thereof shown in the accompanying drawings, may each comprise the following general construction and arrangement. Extending crosswise beneath the cross-beams 13, and secured in place by hanger bolts 14 depending from hanger straps 15 which bridge across the tops of said cross-beams 13, is a base plate 16. This base plate 16 is provided with a centrally disposed internally screw-threaded opening 17 into which is threaded the lower end of a ram cylinder 18. The ram cylinder 18 extends vertically upward between the cross-beams 13. A top plate 19 is provided with a centrally disposed internally screw-threaded opening 20 into which the upper end of said ram cylinder 18 is threaded. The upper end of the ram cylinder 18 is closed by a top cylinder head 21, which may be bolted down to the top plate 19. The lower end of the ram cylinder 18 is closed by a bottom cylinder head 22, which is preferably threaded onto the cylinder end. Slidable in said cylinder, with its lower end extending downwardly through a way therefor provided in the bottom cylinder head 22, is a ram 23 having at its upper end a piston-head 24 to fit the bore of said cylinder. Secured to the lower exterior end of the ram 23 by a suitable coupling connection or holder 25 is a cutter blade 26, disposed transversely relative to the table 10. This cutter blade 26 is provided at its lower free margin with a suitable cutting edge 27. Extending perpendicularly parallel to the ram cylinder 18, respectively at opposite sides thereof, are a pair of tubular housings 28, having their lower ends suitably affixed through and to the base plate 16. These housings 28 extend upwardly through the top plate 19. Extending slidably through bores 29 of reduced diameter, with which the lower end portions of said housings 28 are provided, are slide-rods 30, which respectively extend axially through the interiors of said housings 28, and which are provided at their upper free ends with enlarged stop or abutment heads 31. Surrounding said slide-rods 30 within the housings 28 are compression springs 32, the same having their lower ends footed on the shoulder 33 at the juncture of the bores 29 with the housing interiors, and their upper ends engaged with the stops or abutment heads 31. At their exterior lower ends, said slide-rods 30 are provided with coupling elements 34 for engaging the upper portion of the cutter blade 26 thereto. Extending in opposite directions from said coupling elements 34, so as to overhang opposite side faces of the cutter blade 26, are perforate lugs 35, through which slidably extend, so as to depend therefrom by abutment of their heads 36 therewith, suspension rods 37. The suspension rods on the respective sides of the cutter blade are engaged with and support clamp bars 38, which are thus disposed respectively along the opposite faces of the cutter blade and parallel thereto.

The means for supplying operating fluid to the ram cylinders 18 comprises the following devices. Secured to the table frame work, to extend beneath the table 10, is a platform 39. Secured to the underside of this platform is a fluid supply tank or reservoir 40. Mounted on the platform 39 is a pump 41, preferably of the rotary type, and adapted to be directly driven by an electric motor 42 to which it is coupled. The intake side of this pump 41 is provided with an intake pipe 43, the foot of which extends into and is submerged in the fluid contained in the reservoir 40. The outlet or discharge side of the pump 41 is connected by delivery conduit means or piping 44 with the intake side of a control valve 45, which is affixed to an upright or standard 12 at one side of the machine. Included in this delivery conduit means or piping 44 is a pressure relief valve 46 of any suitable type or kind adapted to trip at a predetermined fluid pressure, and thereby open an auxiliary return pipe 47 leading back into the reservoir 40; thereby operating under certain conditions to automatically stop delivery of operating fluid to the ram cylinders through the delivery conduit means or piping, and thereupon by-passing the pump discharged fluid back to the reservoir 40.

The control valve 45 includes a main casing providing an internal chamber 48 having a closed bottom 49 and an open top, said open top being closed by a cap 50 threaded to the casing or otherwise secured thereto. Within said chamber 48 is a rotatable valve member 51, having a stem 52 extending axially through a stuffing box 53 and cooperating gland 54 with which said cap 50 is provided. Affixed to the exteriorly projecting end of said stem 52 is a manipulating lever 55 by which said valve member 51 may be rotatably manipulated. Said valve casing is provided with an intake port 56 leading into said chamber 48, and said delivery piping 44 is connected to said valve casing in communication with said intake port 56. Said valve member 51 is provided with a valve port 57. Provided in the lower end of said valve casing is a return port 58 which opens into the bottom of the valve chamber 48 beneath the valve member 51. Communicating with the outlet end of said return port 58 is a return conduit or piping 59 which extends back to the reservoir 40. Provided in the lower end of said valve casing is a delivery port 60 which opens into the bottom of the valve chamber 48 beneath the valve member 51. Communicating with the outer end of said delivery port 60 is a delivery conduit or piping 61 which leads to the ram cylinder 18 of the hydraulic ram mechanism A, the same being connected with the upper end of said ram cylinder, so as to deliver actuating fluid thereinto. Also provided in the lower end of said valve casing is a second delivery port 62 which also opens into the bottom of the valve chamber beneath the valve member 51. Communicating with the outer end of this second delivery port 62 is a delivery conduit or piping 63 which leads to the ram cylinder 18 of the hydraulic ram mechanism B, the same being connected with the upper end of this ram cylinder, so as to deliver actuating fluid thereinto. Formed in the bottom of the valve member 51 is a return by-pass passage 64, which communicates through a branch passage 65 with the return port 58. When the valve member 51 occupies its normal initial position, the valve port 57 is in communication with the return port 58, and the by-pass passage 64 is in communication with both the delivery port 60 and the delivery port 62, as shown in Fig. 7. The hand lever 55 for manipulating the valve member 51 is provided with a yieldable latch arm 66, having means at its free end to engage with stop-sockets 67 provided on the exterior of the valve casing to yieldably hold the valve 51 in any selected position to which it may be moved in use.

If desired a suitable guard rail 68 may be secured in extension between the uprights or standards 12 to surround the cutter blade edge portions, when said cutter blades occupy raised inactive or normal positions.

The table 10 is provided with a longitudinal backstop ledge or flange 69, and similarly, across one end thereof, with an end stop ledge or flange 70, against which boxes or trays containing the paste to be cut may be abutted to position such boxes or trays and the content thereof properly beneath the cutter blades of the machine, so that upon operation, the same may properly enter a tray or box and engage the material therein with desired cutting effect.

In the use of the machine, a box or tray 71 containing the lengths of paste product 72 desired to be cut for packaging is placed upon the table 10, so as to abut the back and end stop devices 69 and 70, whereby the box or tray and its content are properly aligned beneath the normally raised cutting blades 26 ready for operation thereof.

The motor 42 being in operation, actuating power is transmitted therefrom to the pump 41. When the control valve 45 has its valve member 51 disposed in normal initial position, the valve port 57 is aligned in communication with the return port 58, and consequently the fluid delivered by the pump 41, through the delivery piping 44 and port 56, passes directly through the valve and back to the reservoir 40 through the return piping 59.

By turning the valve member 51 to register its port 57 with the delivery port 60, the fluid delivered by the pump 41 is directed through piping 61 so as to enter the ram cylinder 18 of the hydraulic ram mechanism A. The fluid thus delivered, acting on the piston-head 24, drives downwardly the ram 23, thereby moving downward the cutting blade 26 carried thereby toward and through the underlying paste product 72. As the cutting blade descends, the clamp-bars 38, which descend therewith, make contact with the paste product 72 so as to hold the same against movement under the cutting action of the blade. The descending movement of the cutting blade also causes an accompanying descending movement of the slide rods 30, whereby the springs 32 are compressed for purposes to be subsequently referred to.

The descent of the cutting blade of the ram mechanism A, shears through the paste product adjacent to the elbow ends of the latter, thus first severing such elbow ends from and thereby trimming the lengths of the paste product. Upon completion of this cutting operation, the valve member 51 is turned to register its port 57 with the delivery port 62, whereby the fluid urged by the pump 41 is now diverted to and directed through the piping 63 leading to the cylinder of the hydraulic ram mechanism B, thus actuating the cutting blade of this latter mechanism to cut through the trimmed paste product intermediate the ends thereof, so as to produce lengths thereof suitable for packaging.

The turning of the valve member 51 to the last mentioned position, whereby the pump delivered fluid is conveyed to the hydraulic ram mechanism B, brings the by-pass passage 64 of said valve member 51 in communication with the delivery piping 61 of the previously actuated hydraulic ram mechanism A, thus putting the cylinder of the latter in direct communication through the by-pass passage 64 with the return piping 59 leading back to the reservoir 40. When such communication is established, the compressed springs 32, acting through the slide-rods 30 and cutting blade 26, operate to raise the ram 23 and piston-head 24 in the cylinder 18 so as to return the same, with the cutting blade, to normal initial uplifted position. As the ram 23 and its piston-head 24 rise in the cylinder 18, the fluid contained in the latter is driven back through the piping 61 and thence through the valve by-pass passage 64 and return piping 59 to the reservoir 40.

In like manner, after actuation of the hydraulic ram mechanism B and the cutting blade thereof, when the valve member 51 is returned to normal initial position, the delivery piping 63 will likewise be brought into communication, through the valve by-pass passage 64, with the return piping 59, so that the spring returned ram and piston of the hydraulic ram mechanism B will in turn be raised to normal initial position, with resultant return of the fluid employed for its previous actuation to the reservoir 40.

In the operation of either of the cutting blades, when the same reach the bottom of their cutting stroke, and further movement thereof is obstructed, the fluid pressure built up in the fluid delivery lines will, on attaining a predetermined maximum pressure, trip the relief valve 46, whereby the fluid discharged by the pump 41 will be directly returned to the reservoir 40 through the auxiliary return pipe 47. When the valve is manipulated to discharge the fluid from hydraulic ram mechanisms in the manner above described, the pressure in the delivery lines will immediately drop to normal, and the relief valve will resume its normal initial position wherein the auxiliary return pipe 47 is closed.

The cut length of the paste product can be varied to suit selected size of packages, by spacing the cutting blades and their actuating means in conformity to the lengths desired to be obtained; and it will also be understood, that the number of cutting blades and their actuating means may be increased or decreased, if desired, without departing from the scope of this invention.

It will be obvious that many changes could be made and many apparently widely different embodiments of this invention could be produced without departing from the scope thereof as defined in the claims appended hereto; consequently it is intended that all matter contained in the above description or shown in the accompanying drawings shall be interpreted as illustrative and not in a limiting sense.

I claim:

1. In a machine for the purposes described having a support for a tray containing the material to be cut and a frame including a transverse portion spaced above said support, a plurality of hydraulically actuated and selectively operable cutter means adjustably mounted on said transverse frame portion for spacing the same according to lengths of cut material desired to be obtained.

2. In a machine for the purposes described having a support for a tray containing the material to be cut and a frame including a transverse portion spaced above said support, a plurality of hydraulically actuated and successively operable cutter means adjustably mounted on said transverse frame portion for spacing the same according to lengths of cut material desired to be obtained.

3. In a machine of the kind described having a support for a tray containing the material to be cut and a frame including a transverse portion spaced above said support, a plurality of hydraulically actuated cutter means adjustably mounted on said transverse frame portion for spacing the same according to lengths of cut material desired to be obtained, and each cutter means having spring means for returning the same to normal initial position after actuation thereof.

NICHOLAS J. CAVAGNARO.